US011410204B2

(12) United States Patent
Li

(10) Patent No.: US 11,410,204 B2
(45) Date of Patent: *Aug. 9, 2022

(54) REAL-TIME CONTENT GENERATION

(71) Applicant: Google LLC, Mountain View, CA (US)

(72) Inventor: Xiaohuan Li, Mountain View, CA (US)

(73) Assignee: Google LLC, Mountain View, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 16/983,547

(22) Filed: Aug. 3, 2020

(65) Prior Publication Data

US 2020/0364756 A1 Nov. 19, 2020

Related U.S. Application Data

(63) Continuation of application No. 14/630,092, filed on Feb. 24, 2015, now Pat. No. 10,769,678.

(51) Int. Cl.
G06Q 30/02 (2012.01)

(52) U.S. Cl.
CPC ..... G06Q 30/0276 (2013.01); G06Q 30/0275 (2013.01)

(58) Field of Classification Search
CPC ..................................... G06Q 30/0207–0277
See application file for complete search history.

(56) References Cited

U.S. PATENT DOCUMENTS

| 7,293,064 | B1 | 11/2007 | Lundy |
| 10,769,678 | B2 | 9/2020 | Li |
| 2008/0313011 | A1 | 12/2008 | Rose |
| 2009/0012868 | A1 | 1/2009 | DeAngelis |
| 2010/0324973 | A1 | 12/2010 | D'Ambrosio |
| 2011/0191163 | A1* | 8/2011 | Allaire ............... H04N 7/17318 705/26.7 |
| 2011/0276397 | A1 | 11/2011 | Moxley |
| 2013/0311561 | A1* | 11/2013 | Ku ....................... H04N 21/854 709/204 |
| 2014/0075293 | A1 | 3/2014 | Makeev |
| 2015/0331583 | A1 | 11/2015 | Zhang |

OTHER PUBLICATIONS

Anthony Quintano, "With an Eye on Wall Street, Twitter Starts Selling Twitter Ads Outside of Tweitter," printed from http://recode.net/2015/02/03/with-an-eye-on-wall-street-twitter-starts-selling-twitter-ads-outisde-of-twitter/ on Feb. 4, 2015, 14 pages.

Garett Sloane, "Here Are the 10 Most Innovative Digital Ad Products of 2014," printed from http://www.adweek.com/news/technology/here-are-10-most-innovative-digital-ad-products-2014-162080 on Feb. 4, 2015, 6 pages.

* cited by examiner

Primary Examiner — Chinyere Mpamugo
(74) Attorney, Agent, or Firm — Fish & Richardson P.C.

(57) ABSTRACT

Systems and methods for publishing content are provided. One method includes generating a content item template for a content item configured for publication within one or more resources. The method further includes storing the content item template within a memory for later publication. The method further includes receiving input data from the content provider and detecting a trigger signal associated with the content item. The method further includes entering the content item into an auction in response to detecting the trigger signal. The method further includes adding the input data provided by the content provider via the interface to the content item template to generate the content item prior to publication of the content item within the one or more resources.

20 Claims, 5 Drawing Sheets

REAL-TIME CONTENT GENERATION

CROSS-REFERENCE TO RELATED APPLICATIONS

This application is a continuation application of, and claims priority to, U.S. patent application Ser. No. 14/630,092, titled "Real-Time Content Generation," filed on Feb. 24, 2015. The disclosure of the foregoing application is incorporated herein by reference in its entirety for all purposes.

BACKGROUND

Content providers often publish content items in networked resources through online content management systems with the goal of having an end user interact with (e.g., click through) the content items and perform a converting action, such as providing information of value to the content providers and/or purchasing a product or service offered by the content providers. Some such content may be designed to relate to recent events, which may help increase the visibility and/or awareness of the content.

SUMMARY

One illustrative implementation of the disclosure relates to a method that includes generating, by one or more processors, a content item template for a content item configured for publication via a content publication network. The content publication network is configured to publish content items within a plurality of resources associated with a plurality of publishers, and the content item is associated with a content provider. The method further includes storing, by the one or more processors, the content item template within a memory for later publication. The method further includes providing, by the one or more processors, an interface configured to receive input data from the content provider. The method further includes receiving, by the one or more processors, the input data from the content provider via the interface and detecting, by the one or more processors, a trigger signal associated with the content item. The method further includes entering, by the one or more processors, the content item into an auction to publish content items within one or more of the plurality of resources of the content publication network in response to detecting the trigger signal. The method further includes modifying, by the one or more processors, the content item template based on the input data provided by the content provider via the interface (e.g., adding the input data to the content item template) to generate the content item prior to publication of the content item within the one or more resources.

Another implementation relates to a system. The system includes at least one computing device operably coupled to at least one memory. The at least one computing device is configured to generate a content item template for a content item configured for publication via a content publication network. The content publication network is configured to publish content items within a plurality of resources associated with a plurality of publishers, and the content item is associated with a content provider. The at least one computing device is further configured to store the content item template within a memory for later publication. The at least one computing device is further configured to provide an interface configured to receive input data from the content provider. The at least one computing device is further configured to receive the input data from the content provider via the interface and detect a trigger signal associated with the content item. The at least one computing device is further configured to enter the content item into an auction to publish content items within one or more of the plurality of resources of the content publication network in response to detecting the trigger signal. The at least one computing device is further configured to modify the content item template based on the input data provided by the content provider via the interface (e.g., add the input data to the content item template) to generate the content item prior to publication of the content item within the one or more resources.

Yet another implementation relates to one or more computer-readable storage media having instructions stored thereon that, when executed by one or more processors, cause the one or more processors to execute operations. The operations include generating a content item template for a content item configured for publication via a content publication network. The content publication network is configured to publish content items within a plurality of resources associated with a plurality of publishers, and the content item is associated with a content provider. The operations further include storing the content item template within a memory for later publication. The operations further include providing an interface configured to receive input data from the content provider. The operations further include receiving the input data from the content provider via the interface and detecting a trigger signal associated with the content item. The operations further include entering the content item into an auction to publish content items within one or more of the plurality of resources of the content publication network in response to detecting the trigger signal. The operations further include modifying the content item template based on the input data provided by the content provider via the interface (e.g., adding the input data to the content item template) to generate the content item prior to publication of the content item within the one or more resources. The operations further include publishing a plurality of first instances of the content item within the resources and receiving interaction data indicating interactions by one or more user devices with the first instances of the content item. The operations further include modifying the content item template to provide an indication relating to the interactions based on the interaction data. The operations further include publishing a second instance of the content item within the resources using the modified content item template including the indication relating to the interactions.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
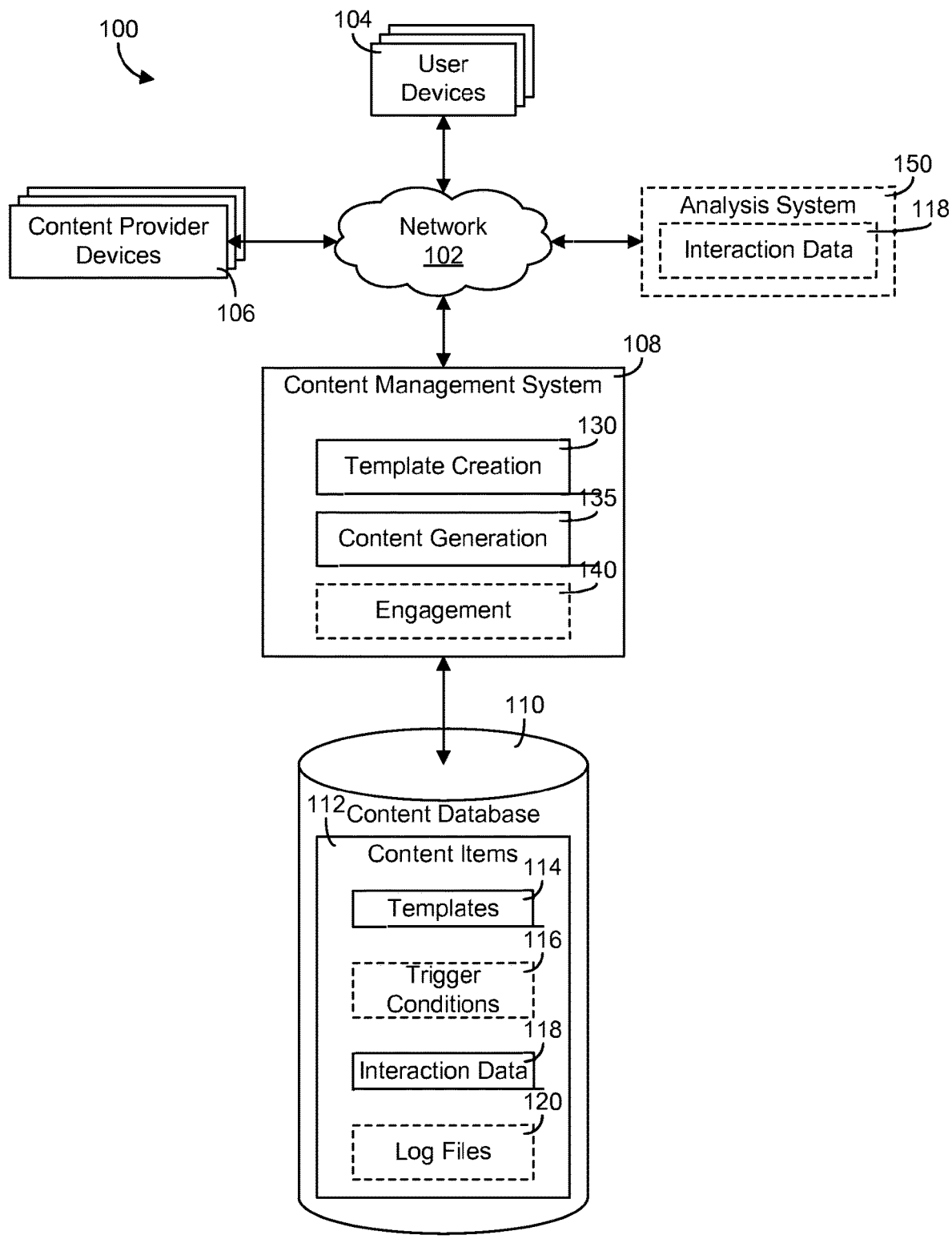
FIG. 1 is a block diagram of a content management system and associated environment according to an illustrative implementation.

Referring generally to the Figures, various illustrative systems and methods are provided that may be used to allow a content provider to provide near real-time content for inclusion in content items published within online resources. Content publication networks often take hours or days after receipt of content to actually publish the content within resources. For example, it may take hours or even days between receipt of content and publication of the content within resources for a content publication network that receives thousands of content items and is configured to publish items within a large number of resources. This can make it difficult for content providers to use content publication systems to publish time-sensitive content, such as content relating to real-time events. Some social media networks allow content publishers to quickly publish content in a manner that allows for fast reaction to current events. For example, a content provider may publish a congratulatory message regarding the winning team of a sporting event quickly to a social media profile. The format and content of the message may be limited based on the structure and/or rules of the social media network. Additionally, the users who view the message may be limited to those users who are already connected with the content provider, so the reach of the message may be limited.

The present disclosure provides illustrative systems and methods that may allow for customized messages and/or other content to be published by content providers within online content publication networks, for example, through auction processes, in a manner such that the content may be published to users shortly after being provided by the content providers. A system may be configured to generate a content item template for a content item to be published via a content publication network including multiple resources (e.g., webpages, applications, etc.) associated with multiple content providers. The content item template may be generated based on input from a content provider. In some implementations, the template may include one or more fields configured to be populated at a later time based on input from the content provider. In some implementations, the one or more trigger conditions for the content item may be specified. For example, one illustrative content item may be related to a Best Picture award of a televised awards program, and a trigger condition may be specified indicating the content item should be withheld from publication in resources and/or inclusion within auctions until the Best Picture award has been announced. In some implementations, the trigger condition may be a manual trigger, such that the content item is not included in auctions and/or otherwise published until the content provider manually triggers activation of the content item. The content item template may be stored in a memory for later publication.

The system may receive input data from the content provider, for example, at a later time. The input data may be received via an interface provided to the content provider. In some implementations, the input data may relate to an event that occurred near the time the input data was provided. In the example in the paragraph above, the input data may be a text string stating "Congratulations to The Best Movie Ever for winning Best Picture!" The input data may include text, images (e.g., a snapshot of an event), video (e.g., live or tape-delayed replay video of an event), and/or any other type of content.

The system may also detect a trigger signal associated with the content item. The trigger signal may indicate that the content item should be entered into one or more auctions for publishing content items within resources. In some implementations, the trigger signal may be a manual trigger provided by the content provider (e.g., the content provider may provide input via an interface indicating the content item should be activated and entered into auctions). In some implementations, the trigger signal may be detected by monitoring trigger conditions associated with the content item. For example, if the trigger condition is the beginning of an event, the system may determine a current time has exceeded a start time associated with the event and automatically activate the trigger signal. In some implementations, receipt of the input data may itself be the trigger signal, such that receipt of the input data causes the content item to be entered into the auction(s).

The system may modify the content item template based on the input data prior to publishing the content item within resources. In some implementations, the content item template may include one or more fields (e.g., text fields) to be populated with the input data, and the fields may be updated to include the input data prior to publication. The updated content items may then be published in the resources with the modified templates. In some implementations, entry of the content item within the auctions and/or publication of the content items may occur within a threshold amount of time after receipt of the input data and/or detection of the trigger signal (e.g., such that the content is published with a small latency after the input data is provided).

Thus, various implementations of the present disclosure may allow content providers to provide content that is published quickly, while still having the content published via a content publication network that includes multiple (e.g., a large number of) resources associated with multiple publishers, as opposed to publishing content within a single resource/website. In some implementations, the template may be processed through a build process, which may take some amount of time (e.g., several hours). In some such implementations, the content item may be generated based on the later-provided input data without repeating the build process, so that the content item can be generated/published without waiting for another build process to complete after receiving the input data.

In some implementations, the system may receive interaction data relating to interaction of user devices with instances of the content item. The system may modify subsequent published instances of the content item to provide information relating to the interaction data. In some implementations, the content item may be modified to provide an indication of a number of views of the content item, clicks or other selections of the content item, conversions performed in relation to the content item (e.g., purchases of a product, downloads of an application, etc.), and/or other types of interactions. Providing an indication of interactions with the content item may help drive popularity of the content item with other users. In some implementations, at least some of the subsequent publications of the content item may occur within a threshold amount of time after the interaction data is received, such that the published interaction data indicates recent data relating to interaction of user devices with the content item.

For situations in which the systems discussed herein collect and/or utilize personal information about users, or may make use of personal information, the users may be provided with an opportunity to control whether programs or features that may collect personal information (e.g., information about a user's social network, social actions or activities, a user's preferences, a user's current location, etc.), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server. Further, the individual user information itself is not surfaced to the content provider, so the content provider cannot discern the interactions associated with particular users.

For situations in which the systems discussed herein collect and/or utilize information pertaining to one or more particular content providers, steps may be taken to prevent individualized data for particular content providers from being discoverable or reverse-engineered. In some implementations, the information may be anonymized in one or more ways before it is utilized, such that the identity of the content provider with which it is associated cannot be discerned from the anonymized information. Additionally, data from multiple content providers may be aggregated, and data presented to a content provider may be based on the aggregated data, rather than on individualized data. In some implementations, the system may include one or more filtering conditions to ensure that the aggregated data includes enough data samples from enough content providers to prevent against any individualized content provider data being obtained from the aggregated data. The system does not present individualized data for a content provider to any other content provider or publish such data without permission.

Referring now to FIG. 1, and in brief overview, a block diagram of a content management system 150 and associated environment 100 is shown according to an illustrative implementation. One or more user devices 104 may be used by a user to perform various actions and/or access various types of content, some of which may be provided over a network 102 (e.g., the Internet, LAN, WAN, etc.). For example, user devices 104 may be used to access websites (e.g., using an Internet browser), media files, and/or any other types of content. Content management system 108 may be configured to select content for display to users within resources (e.g., webpages, applications, etc.) and to provide content items 112 from a content database 110 to user devices 104 over network 102 for display within the resources. The content from which content management system 108 selects items may be provided by one or more content providers via network 102 using one or more content provider devices 106.

In some implementations, bids for content to be selected by content management system 108 may be provided to content management system 108 from content providers participating in an auction using devices, such as content provider devices 106, configured to communicate with content management system 108 through network 102. In such implementations, content management system 108 may determine content to be published in one or more content interfaces of resources (e.g., webpages, applications, etc.) shown on user devices 104 based at least in part on the bids.

Content management system 108 may be configured to provide a way for content providers to generate content to be served with reduced latency. System 108 may generate a template 114 for one or more content items 112. Template 114 may include one or more elements that are predefined or determined at the time the template is created as well as one or more elements to be modified (e.g., filled in) at a later time using input from the content provider. Template 114 may be stored in a memory, such as a content database 110, and retrieved at a later time for modification and publication. The content provider may then provide input data at a later time for use in modifying the previously created template 114. For example, in some implementations, a template 114 may include a text field, and the text field may be filled with a text string provided by the content provider at a later time. System 108 may also detect a trigger signal configured to indicate to system 108 that the content item should be entered into one or more auction processes. System 108 may modify template 114 with the input data provided by the content provider prior to publication of the content item within resources. In some implementations, system 108 may be configured to enter the content items into auctions, modify the content item templates, and/or serve the modified content items with a low latency (e.g., a low as one second) after the content provider provides the input data. In some implementations, content providers may utilize the low latency to generate and publish content relevant to live events, such as awards shows, sporting events, and/or other broadcast events, shortly after the events occur.

Referring still to FIG. 1, and in greater detail, user devices 104 and/or content provider devices 106 may be any type of computing device (e.g., having a processor and memory or other type of computer-readable storage medium), such as a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. In some implementations, one or more user devices 104 may be set-top boxes or other devices for use with a television set. In some implementations, content may be provided via a web-based application and/or an application resident on a user device 104. In some implementations, user devices 104 and/or content provider devices 106 may be designed to use various types of software and/or operating systems. In various illustrative implementations, user devices 104 and/or content provider devices 106 may be equipped with and/or associated with one or more user input devices (e.g., keyboard, mouse, remote control, touchscreen, etc.) and/or one or more display devices (e.g., television, monitor, CRT, plasma, LCD, LED, touchscreen, etc.).

User devices 104 and/or content provider devices 106 may be configured to receive data from various sources using a network 102. In some implementations, network 102 may include a computing network (e.g., LAN, WAN, Internet, etc.) to which user devices 104 and/or content provider device 106 may be connected via any type of network connection (e.g., wired, such as Ethernet, phone line, power line, etc., or wireless, such as WiFi, WiMAX, 3G, 4G, satellite, etc.). In some implementations, network 102 may include a media distribution network, such as cable (e.g., coaxial metal cable), satellite, fiber optic, etc., configured to distribute media programming and/or data content.

Content management system 108 may be configured to conduct a content auction among third-party content providers to determine which third-party content is to be provided to a user device 104. For example, content management system 108 may conduct a real-time content auction in response to a user device 104 requesting first-party content from a content source (e.g., a website, search engine provider, etc.) or executing a first-party application. Content management system 108 may use any number of factors to determine the winner of the auction. For example, the winner of a content auction may be based in part on the third-party content provider's bid and/or a quality score for the third-party provider's content (e.g., a measure of how likely the user of the user device 104 is to click on the content). In other words, the highest bidder is not necessarily the winner of a content auction conducted by content management system 108, in some implementations.

Content management system 108 may be configured to allow third-party content providers to create campaigns to control how and when the provider participates in content auctions. A campaign may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the third-party provider is willing to pay in exchange for their content being presented at user devices 104. In some implementations, the bid amount may be on a cost per impression or cost per thousand impressions (CPM) basis. In further implementations, a bid amount may correspond to a specified action being performed in response to the third-party content being presented at a user device 104. For example, a bid amount may be a monetary amount that the third-party content provider is willing to pay, should their content be clicked on at the client device, thereby redirecting the client device to the provider's webpage or another resource associated with the content provider. In other words, a bid amount may be a cost per click (CPC) bid amount. In another example, the bid amount may correspond to an action being performed on the third-party provider's website, such as the user of the user device 104 making a purchase. Such bids are typically referred to as being on a cost per acquisition (CPA) or cost per conversion basis.

A campaign created via content management system 108 may also include selection parameters that control when a bid is placed on behalf of a third-party content provider in a content auction. If the third-party content is to be presented in conjunction with search results from a search engine, for example, the selection parameters may include one or more sets of search keywords. For instance, the third-party content provider may only participate in content auctions in which a search query for "golf resorts in California" is sent to a search engine. Other illustrative parameters that control when a bid is placed on behalf of a third-party content provider may include, but are not limited to, a topic identified using a device identifier's history data (e.g., based on webpages visited by the device identifier), the topic of a webpage or other first-party content with which the third-party content is to be presented, a geographic location of the client device that will be presenting the content, or a geographic location specified as part of a search query. In some cases, a selection parameter may designate a specific webpage, website, or group of websites with which the third-party content is to be presented. For example, an advertiser selling golf equipment may specify that they wish to place an advertisement on the sports page of an particular online newspaper.

Content management system 108 may be configured to generate content items for publication in resources using templates 114 created and stored in a memory and input data provided by a content provider at a later time and used to modify (e.g., complete) the templates 114. System 108 may include one or more processors (e.g., any general purpose or special purpose processor), and may include and/or be operably coupled to one or more memories (e.g., any computer-readable storage media, such as a magnetic storage, optical storage, flash storage, RAM, etc.).

System 108 may include one or more modules (e.g., implemented as computer-readable instructions executable by a processor) configured to perform various functions of system 108. A template creation module 130 may be configured to generate templates 114 for one or more content items. Each template 114 may include one or more portions to be created or modified at a later time based on input data and/or input from the content provider. For example, in some implementations, a template 114 may include one or more text fields configured to be populated with text provided by the content provider at a later time. In some implementations, templates 114 may be configured to be completed/modified using other types of elements, such as images, videos, and/or other types of content. In some implementations, templates 114 may also include one or more elements that are predetermined (e.g., predefined elements used in multiple content items of the content provider, such as a logo, brand name, color scheme, etc.) and/or one or more elements that are determined based on input provided by the content provider to generate the template (e.g., elements that are not changed based on the later-provided input data from the content provider).

System 108 may also include a content generation module 135 configured to generate content items for publication based on templates 114 and further input provided by the content provider. Content generation module 135 may receive input from the content provider including additional content to be added to a template 114. The additional content may be text (e.g., a text string), images, video, or any other type of content. Module 135 may modify the template 114 of a content item based on the additional content, for example, by adding the additional content to part of the template 114. In some implementations, the template 114 may include one or more fields designated to include additional content (e.g., text fields), and module 135 may add the additional content to the fields prior to publishing the content item based on the modified template 114.

In some implementations, content generation module 135 may trigger entry of the content item into one or more auctions. Module 135 may receive a trigger signal indicating that the content item should be entered into the auctions. In some implementations, the trigger signal may be received with the additional content from the content provider or at a later time. In some implementations, the receipt of the additional content may itself serve as the trigger to enter the content item into auctions. In some implementations, the trigger signal may indicate that one or more trigger conditions 116 associated with the content item have been fulfilled. For example, if a content item references a sporting event, trigger conditions 116 may indicate that the content item should not be published until a beginning/end of the sporting event, and the trigger signal may indicate that the sporting event has started/ended.

In some implementations, system 108 may include an engagement module 140 configured to collect information relating to engagement of user devices 104 with content items. Engagement module 140 may receive interaction data 118 indicating interaction of users on user devices 104 with the content items, such as views of impressions, selections (e.g., clicks) of items, conversions (e.g., purchases of items, downloads of applications, provision of requested information, etc.) performed by users in relation to the items, etc. In some implementations, engagement module 140 may modify one or more subsequently published instances of the content items to provide an indication of the interaction data 118. Providing an indication of interactions of other users may help prompt further interactions by suggesting the popularity of an item may indicate a likelihood other users may also find the item interesting (e.g., may provide the campaign/item with a viral effect). In some implementations, interaction data 118 may be generated based on log files 120 stored in content database 110 that record data relating to previously conducted auctions. In some implementations, interaction data 118 may additionally or alternatively be collected from other sources, such as an analysis system 150 configured to analyze results of auctions and/or campaigns.

Figure 2:
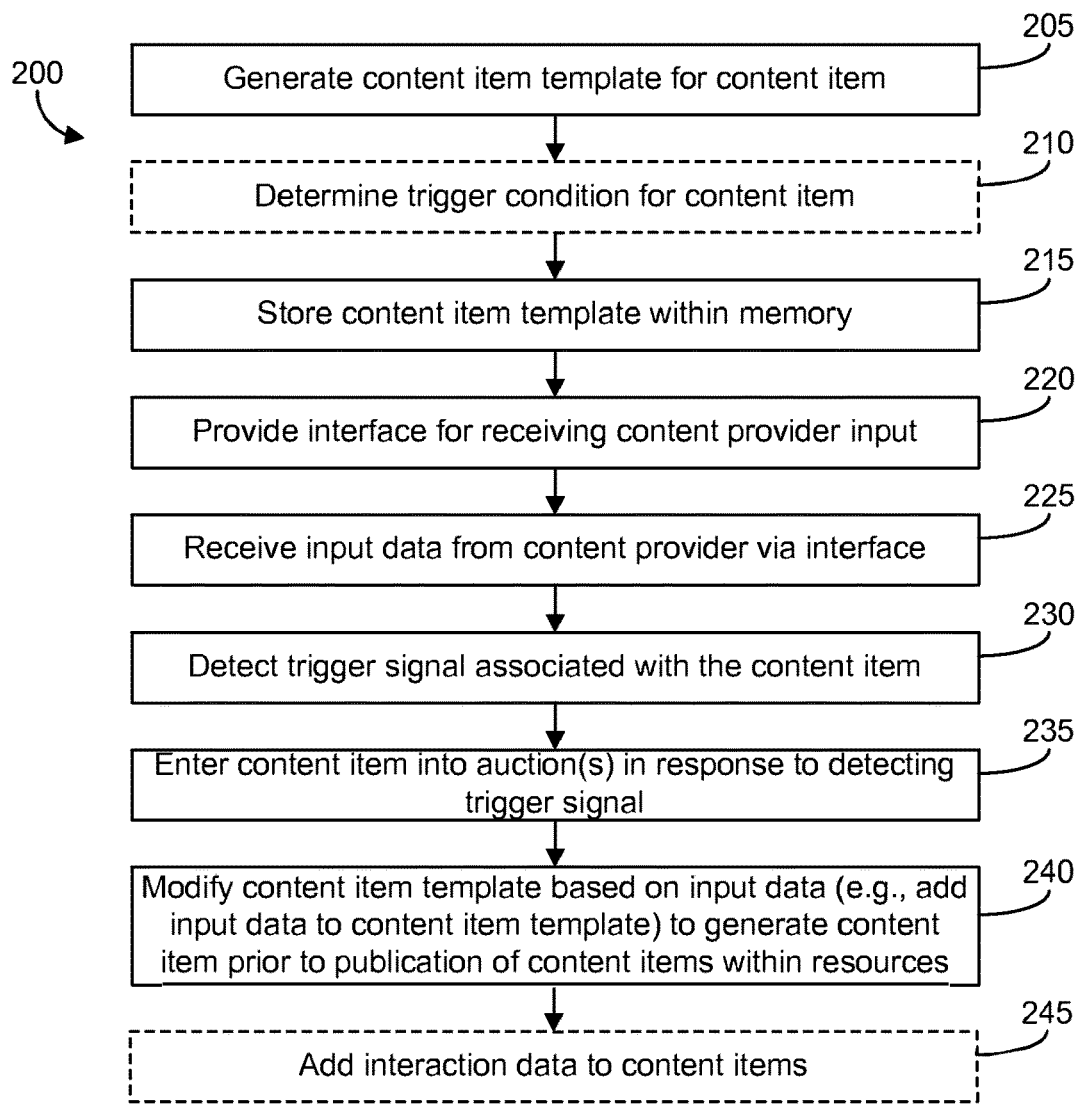
FIG. 2 is a flow diagram of a process for generating content items according to an illustrative implementation.

FIG. 2 illustrates a flow diagram of a process 200 for generating content items according to an illustrative implementation. Process 200 may be executed by, for instance, content management system 108 and may be configured to generate content items to be published by content management system 108 to user devices 104, for example, through auction processes. Content management system 108 may be configured to publish the content items via a content publication network. The content publication network may include multiple resources associated with multiple content providers. Each resource may include one or more interfaces in which content items may be published.

Referring to both FIGS. 1 and 2, system 108 may generate a template 114 for a content item (205). The template 114 may include one or more portions designated to be populated at a later time using input from the content provider. For example, in some implementations, a template 114 may include one or more text fields configured to be populated with a text string provided at a later time. In some implementations, the portions may be populated with one or more other types of content, such as images, videos, etc. In some implementations, the template 114 may be populated with multiple types of content, such as a text string and an image. For example, a template 114 relating to a congratulatory message for a sporting event may include portions to be populated with a logo of a winning team and a name of the winning team once the event has concluded. In some implementations, the template 114 may also include one or more predetermined portions or portions determined at the time of creation of the template 114. In this manner, part of the content item may be determined in advance, and part of the content item may be generated at a later time. In some implementations, one or more of the fields may be configured to limit an amount of characters that can be entered in the field to a threshold amount of characters (e.g., 140 characters), a size of an image entered into the field to a threshold size, a length of a video entered into the field to a threshold length, etc. In some implementations, the template 114 may be processed through a build process to compile the content item. In some such implementations, the build process may take a relatively long amount of time, such as one to four hours.

In some implementations, system 108 may determine one or more auction parameters for use in operating auctions including the content item as a candidate item. The auction parameters may include, for example, one or more keywords associated with the content item, a budget associated with the item or campaign, a bid value associated with the item, and/or other types of parameters for use with the auction. System 108 may be configured to store the template 114 and/or auction parameters within a memory for later retrieval. In some implementations, system 108 may receive input from which the auction parameters are determined at or near a time at which input is received that is used to generate the template 114. The auction parameters may be used to conduct the auction after further input and/or a trigger signal are received.

In some implementations, system 108 may determine a trigger condition 116 for the content item (210). The trigger condition 116 may be a condition to be fulfilled before the content item is entered into auction processes for publication in resources. In some implementations, the trigger condition 116 may be the occurrence of an event with which the content item is associated. For example, if the content item is associated with a broadcast event, the trigger condition 116 may be a start of the event, an end of the event, the occurrence of a particular outcome (e.g., a team or individual winning a sporting event, an entertainer winning an award at an awards show, etc.), and/or any other occurrence associated with the event. System 108 may store template 114 and, optionally, trigger condition 116, within a memory (e.g., content database 110) (215).

System 108 may provide an interface for receiving content provider input (220). In some implementations, the interface may be provided via a frontend module of system 108 configured to generate data to render the interface on the content provider device 106 (e.g., within a web browser or application). In some implementations, the interface may be or include a link to another interface through which the content provider may provide input. For example, in some implementations, the interface may link to a social media account of the content provider. When the content provider enters input through the social media account, in some implementations and/or under some conditions (e.g., if the input matches conditions used to determine whether the input relates to a content item template 114), the input may be used to populate a portion of the template 114. In this manner, the content provider may provide content through both a social media account and through auctions conducted by system 108 without entering the input twice in separate interfaces. One illustrative interface 600 is described below with respect to FIG. 6.

System 108 may receive input data from the content provider via the interface (225). In some implementations, the content provider may provide the input data in one or more fields provided within the interface (e.g., within a webpage form). The input may be any type of input, such as text, images, video, etc. In some implementations, the content provider may provide the input through the interface indirectly by providing the input via a separate interface linked to the interface (e.g., a linked social media interface).

System 108 may also detect a trigger signal associated with the content item (230). The trigger signal may indicate that the associated content item can be entered into auctions. In some implementations, the trigger signal may be a signal indicating fulfillment of the trigger condition 116 associated with the item. For example, if the trigger condition 116 indicates that the content item should be withheld from auctions until the beginning of a particular football game, the trigger signal may indicate that the football game has started. In some implementations, the content provider may manually provide the trigger signal. For example, in one implementation, the content provider may enter a content item or campaign identifier into the interface indicating that the associated content item should be entered into auctions. In another implementation, the content provider may establish one or more trigger conditions 116 at the time of generating templates 114, and the interface may allow the content provider to select one or more of the trigger conditions 116 to indicate the trigger conditions have been fulfilled. In some implementations, receipt of the input data may itself serve as the trigger signal, such that, upon receiving the input data, the content item may be entered into auctions.

In some implementations, system 108 may be configured to monitor one or more trigger conditions and automatically determine if the conditions have been met to generate the trigger signal (e.g., modify data stored in memory representative of whether the trigger has occurred or transmit a command to a module to enter the content item into auctions). For example, if a trigger condition is that an event has started, system 108 may compare a current time to a start time of the event and, if the current time exceeds the start time, detect that the trigger condition has been fulfilled. In some implementations, system 108 may determine whether input has been received from the content provider to complete the template 114 before allowing the content item to be entered into auctions after detecting fulfillment of the trigger condition.

System 108 may enter the content item into one or more auctions in response to detecting the trigger signal (235). In some implementations, system 108 may be configured to select content items for inclusion in auctions based on one or more criteria, such as keywords associated with the items and/or the resource in which the items are to be presented. In some such implementations, system 108 may only select content items for inclusion in auctions if trigger data indicates the content items are ready for inclusion. If a trigger signal has not been received, system 108 may withhold the content item from inclusion in auctions. In some implementations, entry of the content item within the auctions and/or publication of the content items may occur within a threshold amount of time after receipt of the input data and/or detection of the trigger signal (e.g., such that the content is published with a small latency after the input data is provided).

System 108 may modify the template 114 based on the input data to generate the content item (e.g., by adding the input data to the template 114) prior to publication of the content item within resources (240). In some implementations, system 108 may add additional content provided by the input from the content provider to the template 114 to generate the content item (e.g., add text to a text field of the template 114). In some implementations, system 108 may additionally or alternatively modify one or more previously defined portions of the template 114 based on the input (e.g., change existing text, replace or modify an image, etc.). In some implementations, system 108 may modify the template 114 based on the input before the content item is entered into auctions (e.g., in response to receiving the input). In some implementations, system 108 may modify the template 114 after the content item is entered into auctions, such as in response to the content item being selected as a winning item in an auction.

In some implementations, system 108 may be configured to generate the content item and/or enter the content item into auctions without processing the content item through another build process after the input data is received. In some such implementations, this may allow the content item to be generated and/or published with a much lower latency (e.g., seconds) than if the content item were subjected to another build process, which may take hours.

Figure 3:
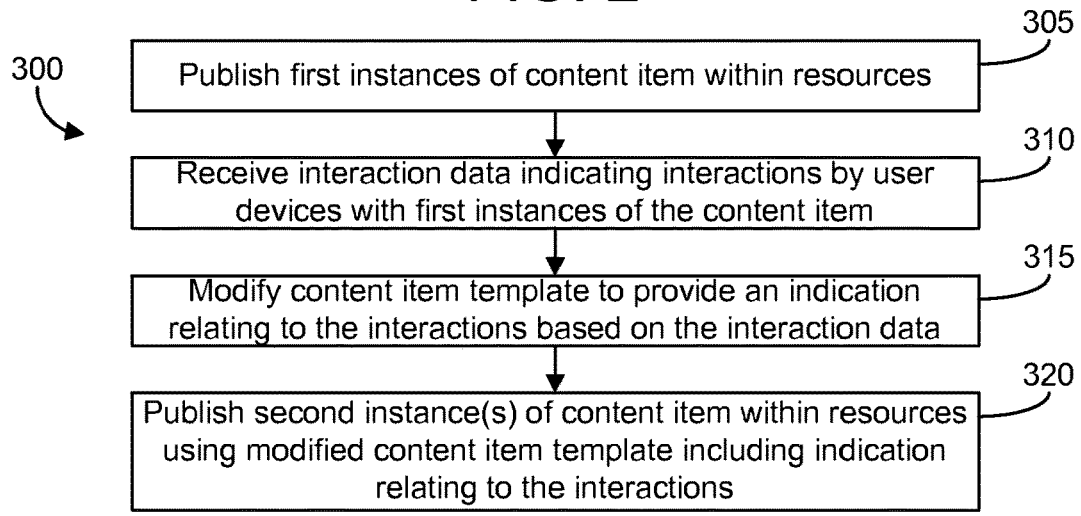
FIG. 3 is a flow diagram of a process for generating content items including information relating to user interactions according to an illustrative implementation.

In some implementations, system 108 may be configured to receive interaction data 118 and add an indication of interactions with the content to subsequent published instances of the content item (245). FIG. 3 shows a flow diagram of a process 300 for adding interaction data to content items according to an illustrative implementation. In some implementations, process 300 may be used in conjunction with process 200 to add an indication of interactions to content items generated using templates 114 and input providing additional content (e.g., as part of block 245), as described above. In other implementations, process 300 may be used separately to add an indication of interactions to content items without generating the content items according to process 200.

Referring now to FIGS. 1 and 3, system 108 may publish multiple first instances of a content item within resources (305). In some implementations, the content item may have been generated based on input provided by a content provider and used to modify a template 114.

System 108 may receive interaction data 118 indicating interactions by users via user devices 104 with the first instances of the content items (310). In various implementations, interaction data 118 may include data relating to one or more of various types of interactions, such as views of impressions, clicks or other selections of items, conversion activities, and/or other types of interactions. Interaction data 118 may provide various types of data (e.g., quantitative data) regarding the interactions, such as how many interactions occurred, a length of the interactions, how many different user devices 104 were associated with the interactions, how many repeat interactions by the same user devices 104 occurred, etc.

System 108 may modify the template 114 of the content item based on interaction data 118 to provide an indication relating to the interactions and generate a modified content item (315). In some implementations, the template 114 may be modified to indicate a number of interactions with the published first instances of the content item reflected within interaction data 118 (e.g., a number of clicks, views, and/or conversions). In some implementations, the template 114 may be modified to add indications of other types of interactions, such as those described above. In some implementations, interaction data 118 may be updated (e.g., continuously, periodically, upon the occurrence of one or more events, etc.) so subsequently published content items include current interaction data.

System 108 may publish one or more second instances of the content item within resources using the modified template 114 including the indication relating to the interactions (320). The second instances may provide an indication to users of the popularity of the content item and/or the material to which the content item is linked (e.g., a webpage, an item for sale, etc.). In some implementations, the indication may help drive further interactions with the item by informing users of the high popularity of certain content items with other users. In some implementations, the second instances may be published within a threshold amount of time after receiving interaction data 118 to help ensure the interaction data 118 is current.

Figure 4:
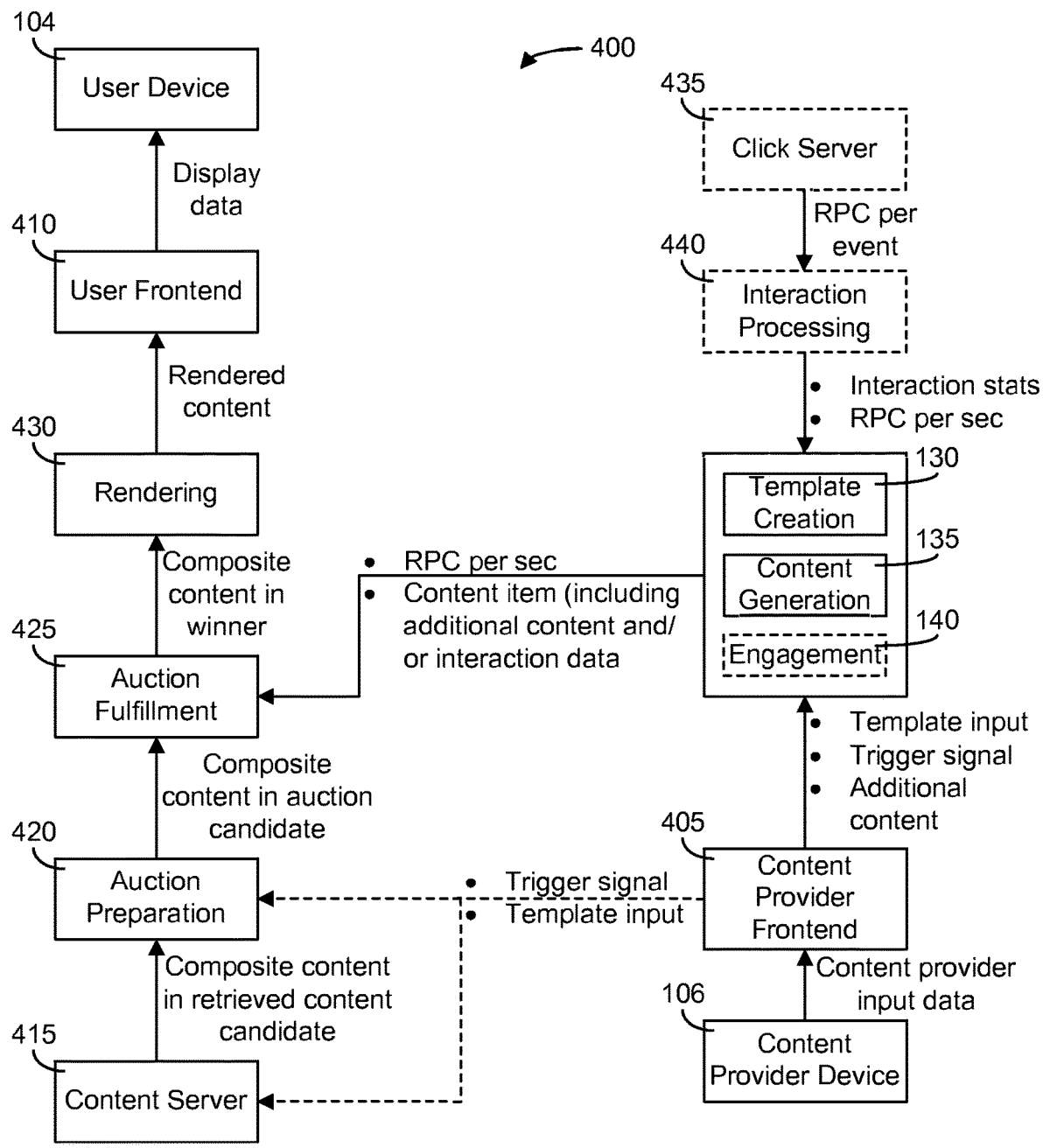
FIG. 4 is a block diagram of a detailed implementation of a content management system according to an illustrative implementation.

Referring now to FIG. 4, one detailed illustrative implementation 400 of content management system 108 is provided. In the illustrated implementation, content management system 108 includes various modules configured to execute methods and features such as those described in FIGS. 1-3. It should be understood that the detailed implementation of content management system 108 shown in FIG. 4 is provided for purposes of illustration, and in other implementations, content management system 108 may include additional, fewer, and/or different components. Further, each of the illustrated systems and/or components may be implemented as a separate computing system, multiple systems may be combined within a single hardware system, and/or one or more systems or components may be implemented in a cloud, or distributed computing, environment.

Content provider devices 106 may provide information to and/or receive information from content management system 108 via a content provider frontend 405. Content provider frontend 405 may provide an interface through which content providers can provide data, modify settings or parameters used by content management system 108, receive information from content management system 108, etc. In some implementations, content provider frontend 405 may be or include a web-based user interface (e.g., implemented via a web-based programming language such as HTML, Javascript®, etc.). In some implementations, content provider frontend 405 may include a custom API specific to a particular content provider. In some implementations, content provider frontend 405 may allow content providers to upload data individually and/or in batches. While the implementation shown in FIG. 4 illustrates content provider devices 106 and frontend 405, other components of system 100 may connect with content management system 108 in a similar manner. In some implementations, content provider frontend 405 may be configured to generate an interface with which the content providers may interact on content provider devices 106. The interface may provide input fields through which the content provider may provide input used to generate templates 114, input used to modify the templates 114, trigger signals used to determine when to enter content items into auctions, parameters (e.g., bid parameters, keywords, etc.) used in the auctions, and/or other types of input.

Content provider frontend 405 may transmit data to and receive data from an analysis system backend, which may include or be coupled to template creation module 130, content generation module 135, and/or engagement module 140. Content provider frontend 405 may transmit input data used to generate templates 114 to template creation module 130, and template creation module 130 may utilize the input data to generate templates 114 for one or more of the content items. In some implementations, the template-related input may additionally or alternative be provided to a content server 415 and/or an auction preparation module 420, and one or both of these modules may be configured to generate and/or modify templates 114 stored in memory based on the input.

Content provider frontend 405 may also transmit input representative of additional content received from the content provider to content generation module 135 for use in generating content to be published. Content generation module 135 may add the input to a template 114 or otherwise modify the template 114 to generate the content item to be published. Module 135 may transmit the modified content item to an auction fulfillment module 425 configured to process content items for winning bids from auctions. In some implementations, content generation module 135 may provide the modified content item to auction fulfillment module 425 in response to receiving the input and processing the modification and/or receiving a trigger signal. In some implementations, content generation module 135 will wait to receive a request for the content item from auction fulfillment module 425 (e.g., in response to the content item being selected for publication as part of the auction process) before transmitting the content item.

In some implementations, content provider frontend 405 may also provide a trigger signal received from the content provider device 106 to content generation module 135. In some implementations, the input itself may be the trigger signal. In some implementations, content generation module 135 may compare the trigger signal to trigger conditions stored in memory to determine whether one or more content items are ready to be included in auctions. In some implementations, content generation module 135 and/or content provider frontend 405 may notify one or more other modules, such as content server 415 and/or auction preparation module 420, when a trigger signal has been received and a content item is ready for inclusion in auctions.

Content server 415 may serve content items for one or more candidate bids to auction preparation module 420. Auction preparation module 420 may prepare the bids for inclusion in an auction and generate a composite data item for each auction candidate and transmit the data to auction fulfillment module 425. Auction fulfillment module 425 may determine one or more winning candidates for the auction and, for each winning candidate, generate composite data for the winning content. The data may include the modified content item generated by content generation module 135 based on the input from the content provider. The data may be provided to a rendering engine 430 configured to render the content within the resource (e.g., within data to be used by user devices 104 to display the resource, such as HTML code). The rendering engine may provide the rendered content to a user frontend 410 configured to prepare the data in a format for display on user devices 104.

In some implementations, system 108 may include, or receive data from, a click server 435 and/or interaction processing module 440. Click server 435 is configured to collect data representing interactions of users with published content items, such as views, clicks, conversions, etc. Click server may generate data for each event (e.g., each click) and transmit the data to interaction processing module 440. The data may include a content item identifier, campaign identifier, or other data used to identify the content with which the interaction occurred. In some implementations, click server 435 may transmit data to interaction processing module 440 through one or more remote procedure calls. In some such implementations, a separate remote procedure call may be utilized for each event.

Interaction processing module 440 may be configured to aggregate and/or otherwise process the interaction data provided by click server 435. For example, interaction processing module 440 may receive remote procedure calls per event and generate data representing interactions over a particular timeframe (e.g., interactions per second, minute, etc.). In some implementations, interaction processing module 440 may aggregate interaction information or statistics relating to a particular content item or campaign and transmit the information to engagement module 140. Engagement module 140 may associate the information with a particular content item or campaign, and may modify subsequently published instances of the content item to reflect information relating to the interaction statistics, such as a number of views, clicks, conversions, etc.

Figure 5:
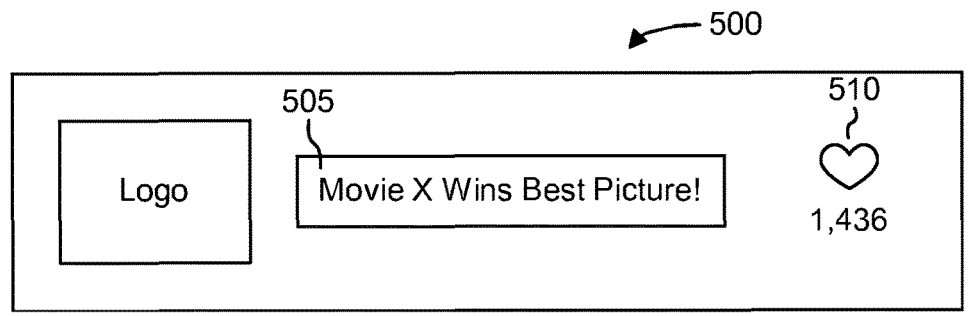
FIG. 5 is an illustration of a content item modified based on input data from a content provider and interaction data according to an illustrative implementation.

Referring now to FIG. 5, an illustration of a content item 500 modified based on input data from a content provider and interaction data is shown according to one implementation. Content item 500 includes a logo (e.g., a logo of the content provider) that may have been defined as part of the template at the time the template was created. Content item 500 further includes a text field 505 including text provided by the content provider. In the illustrated implementation, text field 505 is populated with the text string "Movie X Wins Best Picture!" In one implementation, the content provider may provide this text as input to an interface after a best picture award of a broadcast awards program was announced. The content provider may indicate through the interface that content item 500 is ready for inclusion in auctions (e.g., by providing input indicating the best picture award was announced), triggering inclusion of content item 500 within auctions. In the illustrated implementation, content item 500 also includes interaction data 510 indicating a number of clicks users have made on previously published instances of content item 500.

Figure 6:
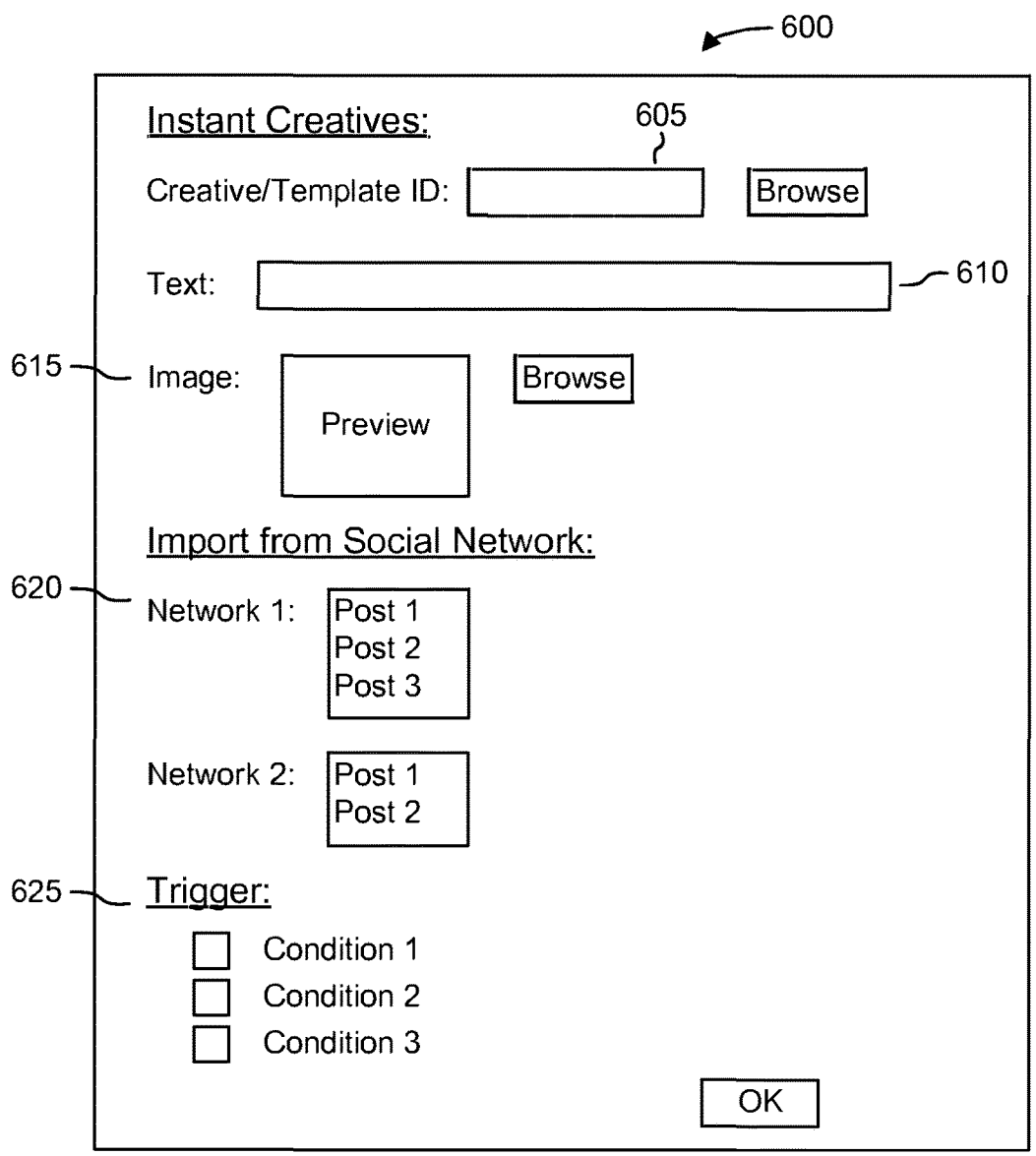
FIG. 6 is an illustration of an interface configured to be provided to a content provider through which the content provider can provide input data for use in modifying a content item template according to an illustrative implementation.

Referring now to FIG. 6, an illustration of a user interface 600 that may be presented on a content provider device and through which the content provider can provide input data for use in modifying a content item template according to one implementation. User interface 600 includes a content item or template identification field 605 through which the content provider may specify a content item and/or template to be modified based on the input provided through interface 600. Interface 600 may include a text field 610 through which the content provider may enter text to be added to the content item prior to publication and/or an image field 615 through which the content provider may provide an image to be added to the content item. In some implementations, the content provider may provide input indirectly by linking interface 600 to one or more other interfaces/accounts. For example, a social network field 620 may allow the content provider to link to one or more social networking accounts for networks in which the content provider can share content with others. The content provider may provide authentication information for the social network accounts through interface 600 or through a separate interface of the social networks. In some such implementations, by linking the social network accounts using social network field 620, the content provider may be able to add some content posted on the social networks to the content item template without separately providing the content through a field of interface 600 (e.g., text field 610 and/or image field 615). Interface 600 may also include a trigger field 625 providing one or more trigger signals the content provider may select to indicate that content items are ready to enter into auctions (e.g., separate from or in addition to identification field 605). In some implementation, the content provider may have previously defined the trigger conditions, such as when the template was created.

Figure 7:
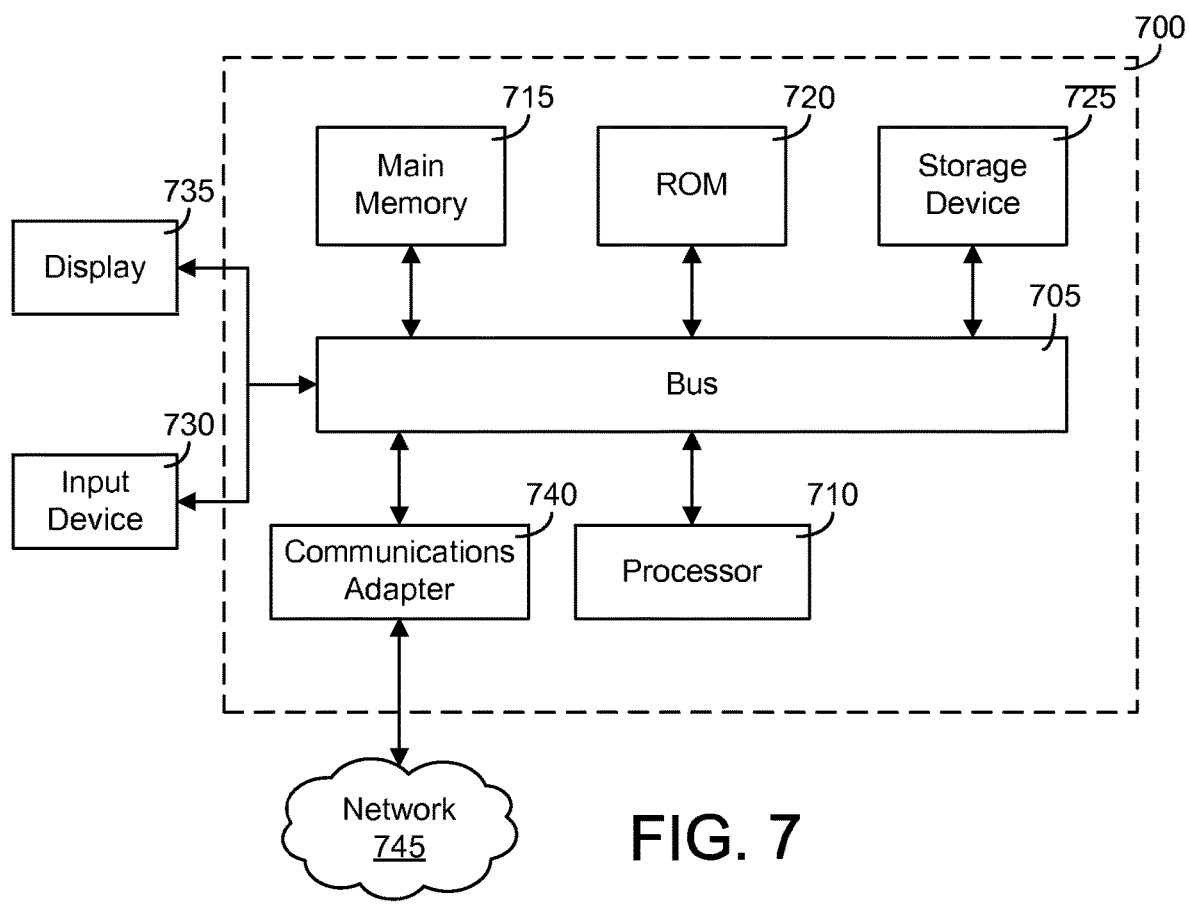
FIG. 7 is a block diagram of a computing system according to an illustrative implementation.

FIG. 7 illustrates a depiction of a computer system 700 that can be used, for example, to implement an illustrative user device 104, an illustrative content management system 108, an illustrative content provider device 106, an illustrative analysis system 150, and/or various other illustrative systems described in the present disclosure. Computing system 700 includes a bus 705 or other communication component for communicating information and a processor 710 coupled to bus 705 for processing information. Computing system 700 also includes main memory 715, such as a random access memory (RAM) or other dynamic storage device, coupled to bus 705 for storing information, and instructions to be executed by processor 710. Main memory 715 can also be used for storing position information, temporary variables, or other intermediate information during execution of instructions by processor 710. Computing system 700 may further include a read only memory (ROM) 710 or other static storage device coupled to bus 705 for storing static information and instructions for processor 710. A storage device 725, such as a solid state device, magnetic disk or optical disk, is coupled to bus 705 for persistently storing information and instructions.

Computing system 700 may be coupled via bus 705 to a display 735, such as a liquid crystal display, or active matrix display, for displaying information to a user. An input device 730, such as a keyboard including alphanumeric and other keys, may be coupled to bus 705 for communicating information, and command selections to processor 710. In another implementation, input device 730 has a touch screen display 735. Input device 730 can include a cursor control, such as a mouse, a trackball, or cursor direction keys, for communicating direction information and command selections to processor 710 and for controlling cursor movement on display 735.

In some implementations, computing system 700 may include a communications adapter 740, such as a networking adapter. Communications adapter 740 may be coupled to bus 705 and may be configured to enable communications with a computing or communications network 745 and/or other computing systems. In various illustrative implementations, any type of networking configuration may be achieved using communications adapter 740, such as wired (e.g., via Ethernet®), wireless (e.g., via WiFi®, Bluetooth®, etc.), pre-configured, ad-hoc, LAN, WAN, etc.

According to various implementations, the processes that effectuate illustrative implementations that are described herein can be achieved by computing system 700 in response to processor 710 executing an arrangement of instructions contained in main memory 715. Such instructions can be read into main memory 715 from another computer-readable medium, such as storage device 725. Execution of the arrangement of instructions contained in main memory 715 causes computing system 700 to perform the illustrative processes described herein. One or more processors in a multi-processing arrangement may also be employed to execute the instructions contained in main memory 715. In alternative implementations, hard-wired circuitry may be used in place of or in combination with software instructions to implement illustrative implementations. Thus, implementations are not limited to any specific combination of hardware circuitry and software.

Although an example processing system has been described in FIG. 7, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
storing, by a content publication system, a content item template for a content item within a memory for later publication, wherein the content item template includes a set of content and one or more fields configured to be populated at a later time based on subsequent input from a content provider;
prior to receiving the subsequent input from the content provider, withholding the content item from publication;
receiving, by the content publication system, the subsequent input from the content provider through a social media interface that is separate from an interface of the content publication system;
detecting a trigger signal indicating that the content item is available for distribution, wherein the trigger signal is defined by the content provider;
populating, by the content publication system, the stored content item template with the subsequent input data received from the content provider through the social media interface to generate the content item prior to publication of the content item within tho a resource provided by the publisher; and
providing, by the content publication system, the content item that includes the subsequent input data received from the content provider through the social media interface for presentation in the resource provided by the publisher.

2. The method of claim 1, further comprising: linking, by the content publication system, to a social network account of the content provider.

3. The method of claim 1, further comprising entering the content item into an auction within a threshold amount of time after receipt of the subsequent input data or detecting the trigger signal.

4. The method of claim 1, further comprising receiving input indicating manual activation of the trigger signal by the content provider.

5. The method of claim 1, wherein detecting the trigger signal comprises:
monitoring, by the one or more processors, a trigger condition and determining whether the trigger condition has been fulfilled; and
activating the trigger signal in response to determining the trigger condition has been fulfilled.

6. The method of claim 1, further comprising
publishing a plurality of first instances of the content item within the one or more resources;

receiving interaction data indicating interactions at one or more user devices with the first instances of the content item;

modifying the content item template to provide an indication relating to the interactions based on the interaction data; and publishing a second instance of the content item within the one or more resources using the modified content item template including the indication relating to the interactions.

7. The method of claim 6, wherein receiving interaction data comprises receiving data relating to one or more of: a number of views of the content item; a number of selections of the content item; or a number of conversions associated with the content item.

8. A system comprising:

at least one computing device operably coupled to at least one memory and configured to perform operations including:

storing, in the at least one memory, a content item template for a content item within a memory for later publication, wherein the content item template includes a set of content and one or more fields configured to be populated at a later time based on subsequent input from a content provider;

prior to receiving the subsequent input from the content provider, withholding the content item from publication;

receiving the subsequent input from the content provider through a social media interface that is separate from an interface of the content publication system;

detecting a trigger signal indicating that the content item is available for distribution, wherein the trigger signal is defined by the content provider;

populating the stored content item template with the subsequent input data received from the content provider through the social media interface to generate the content item prior to publication of the content item within a resource provided by the publisher; and providing the content item for presentation in the resource provided by the publisher.

9. The system of claim 8, wherein the at least one computing device is configured to perform operations further comprising: linking, by the content publication system, to a social network account of the content provider.

10. The system of claim 8, wherein the at least one computing device is configured to perform operations further comprising entering the content item into an auction within a threshold amount of time after receipt of the subsequent input data or detecting the trigger signal.

11. The system of claim 8, wherein the at least one computing device is configured to perform operations further comprising receiving input indicating manual activation of the trigger signal by the content provider.

12. The system of claim 8, wherein detecting the trigger signal comprises:

monitoring, by the one or more processors, a trigger condition and determining whether the trigger condition has been fulfilled; and activating the trigger signal in response to determining the trigger condition has been fulfilled.

13. The system of claim 8, wherein the at least one computing device is configured to perform operations further comprising:

publishing a plurality of first instances of the content item within the one or more resources;

receiving interaction data indicating interactions at one or more user devices with the first instances of the content item;

modifying the content item template to provide an indication relating to the interactions based on the interaction data; and publishing a second instance of the content item within the one or more resources using the modified content item template including the indication relating to the interactions.

14. The system of claim 13, wherein receiving interaction data comprises receiving data relating to one or more of: a number of views of the content item; a number of selections of the content item; or a number of conversions associated with the content item.

15. One or more non-transitory computer-readable storage media having instructions stored thereon that, when executed by one or more processors, cause the one or more processors to execute operations comprising:

storing, in the at least one memory, a content item template for a content item within a memory for later publication, wherein the content item template includes a set of content and one or more fields configured to be populated at a later time based on subsequent input from a content provider;

prior to receiving the subsequent input from the content provider, withholding the content item from publication;

receiving the subsequent input from the content provider through a social media interface that is separate from an interface of the content publication system;

detecting a trigger signal indicating that the content item is available for distribution, wherein the trigger signal is defined by the content provider;

populating the stored content item template with the subsequent input data received from the content provider through the social media interface to generate the content item prior to publication of the content item within a resource provided by the publisher; and providing the content item for presentation in the resource provided by the publisher.

16. The non-transitory computer-readable storage media of claim 15, wherein the instructions cause the one or more processors to perform operations further comprising: linking, by the content publication system, to a social network account of the content provider.

17. The non-transitory computer-readable storage media of claim 15, wherein the instructions cause the one or more processors to perform operations further comprising entering the content item into an auction within a threshold amount of time after receipt of the subsequent input data or detecting the trigger signal.

18. The non-transitory computer-readable storage media of claim 15, wherein the instructions cause the one or more processors to perform operations further comprising receiving input indicating manual activation of the trigger signal by the content provider.

19. The non-transitory computer-readable storage media of claim 15, wherein detecting the trigger signal comprises:

monitoring, by the one or more processors, a trigger condition and determining whether the trigger condition has been fulfilled; and activating the trigger signal in response to determining the trigger condition has been fulfilled.

20. The non-transitory computer-readable storage media of claim 15, wherein the instructions cause the one or more processors to perform operations further comprising:

publishing a plurality of first instances of the content item within the one or more resources;
receiving interaction data indicating interactions at one or more user devices with the first instances of the content item;
modifying the content item template to provide an indication relating to the interactions based on the interaction data; and
publishing a second instance of the content item within the one or more resources using the modified content item template including the indication relating to the interactions.

* * * * *